United States Patent Office 3,222,262
Patented Dec. 7, 1965

3,222,262
PROCESS FOR THE RECOVERY OF METHANOL FREE AND WATER FREE METHYLAL
Eduard Enk, Fritz Knörr, and Hellmuth Spes, all of Burghausen, Upper Bavaria, Germany, assignors to Wacker-Chemie G.m.b.H., Munich, Germany
No Drawing. Filed Nov. 13, 1961, Ser. No. 152,008
Claims priority, application Germany, Nov. 22, 1960, W 28,965
1 Claim. (Cl. 202—39.5)

The present invention relates to an improved process for the recovery of alcohol free and water free acetals from alcohol and/or water containing acetals.

For various reactions it is necessary to employ alcohol free and water free acetals in order to avoid undesired side reactions. Technical acetals, however, usually still contain a few percent of alcohol derived from their production which cannot be separated off by simple distillation because of the close proximity of their boiling points or because of azeotrope formation. The processing of methylal produced from methanol and formaldehyde by distillation at best only leads to the composition of the azeotropic mixture.

It has already been proposed to remove methanol contained in methylal with concentrated aqueous salt or alkali metal hydroxide solutions. Aside from the fact that methanol cannot be removed completely by this method, a water containing methylal is obtained thereby, from which the water must be removed by a further azeotropic distillation or dehydrating agents. These procedures are troublesome and engender losses.

According to a further suggestion methanol-methylal is distilled azeotropically with the addition of water. While a methanol free methylal can be obtained in this manner, water again is introduced into the end product which must again be removed so that in principle the same disadvantages occur as in the above process.

According to the invention it was found that pure alcohol free and water free acetals can be recovered from water and/or alcohol containing acetals when such mixtures are fractionally distilled in contact with liquid compounds of the general formula $RXX'_n$ wherein R designates an aliphatic hydrocarbon radical containing at least two carbon atoms whose straight or branched hydrocarbon chain can also be interrupted by heteroatoms, such as, for example, oxygen and nitrogen, X being a radical selected from the group consisting of —OH and —NH$_2$, and X' signifies —OH, —OR', —NH$_2$, —NHR' or —NR'$_2$, R' being an alkyl group and $n$ being an integer. Compounds which can advantageously be used in the process according to the invention, for example, are: polyamines, such as ethylene diamine, diethylene triamine, triethylene tetramine, 1,2,3-triamino propane, amino alcohols, such as ethanol amine, diethanol amine, triethanol amine, polyols, such as glycol, glycerine, 1,3-butylene glycol, diethylene glycol, triethylene glycol, or polyols which are partially but not completely etherified, such as the alkyl ethylene glycols, alkyl diethylene glycols and alkyl triethylene glycols.

The water and alcohol containing acetals which are processed according to the invention can, for example, be those occurring as reaction products in the production of acetals from alcohols and aldehydes. The process according to the invention renders it possible to obtain the acetals in water free and alcohol free form in a single processing step. Of course, acetals containing only one of the disturbing water and alcohol components can also be processed advantageously according to the invention. The process according to the invention can also be used for acetal-alcohol mixtures, the alcohol of which is not identical with the alcohol component of the acetal, the separation of which by simple distillation is difficult because of the proximity of the boiling points of the alcohol and acetal in such mixture.

The quantity of the compound $RXX'_n$ required for the complete separation of the alcohol and/or water can easily be determined by a preliminary test.

The process can, for example, be carried out by continuously introducing the acetal to be purified into the lower part of a fractionating column and continuously introducing the compound $RXX'_n$ into the upper end thereof. The proper ratio of crude acetal to compound $RXX'_n$ so that pure acetal is drawn off at the head of the column and water and/or alcohol containing compound $RXX'_n$ from the sump is easily determined by a simple preliminary test.

The effluent from the sump is processed by driving off the lower boiling components.

The pure acetal obtained according to the invention can be used directly in reactions in which the presence of water or alcohol must be excluded, such as, for example, in the reaction with ketene to produce β-alkoxy carboxylic acid alkyl esters.

The following examples will serve to illustrate the process according to the invention with reference to a number of specific embodiments thereof.

Example 1

332.5 g. per hour of a mixture of 76% of methylal and 24% of methanol were introduced into the lower third of a fractionating column at 35° C. while 111 g. per hour of ethylene glycol were introduced into the upper third of such column at 62° C. The volumetric ratio of the liquids supplied was 4:1. As an average, 250 g. per hour of pure methylal were withdrawn from the head of the column and 189 g. per hour of effluent containing 78 g. of methanol recoverable by distillation were withdrawn from the sump of the column. The effluent from the sump was practically free of methylal. The yields with practically complete separation were almost quantitative.

Example 2

Analogously to Example 1, 515 g. per hour of a mixture of 94.6% of methylal and 5.4% of methanol and 111 g. per hour of ethylene glycol were supplied to the column in a volumetric ratio of 6:1. As an average, 485 g. per hour of pure methylal were withdrawn from the head of the column and 544 g. per hour of sump effluent containing 27 g. of methanol were withdrawn from the bottom of the column. The yields were almost quantitative.

Example 3

534 g. per hour of a mixture obtained by reaction of methanol with formaldehyde in the presence of water and a catalyst and consisting of 60% of methylal, 20% methanol and 20% of water were introduced as in Example 1 into the lower end of a fractionating column at 30–35° C., while 111 g. per hour of ethylene glycol were introduced into the upper end of the column at 60–63° C. The volumetric ratio of the mixture to ethylene glycol was 6:1. As an average, 318 g. per hour of pure methanol free and water free methylal were withdrawn from the head of the column whereas 767 g. per hour of a methanol-water-ethylene glycol mixture ran off from the sump overflow. The yields again were practically quantitative.

Example 4

508 g. per hour of a mixture of 97% methylal with 3% of water and 109.6 g. per hour of ethylene glycol were supplied to a fractionating column as in Example 1 in a volumetric ratio of 6:1. As an average, 490 g. per hour of pure methylal were withdrawn from the head of the column and 125 g. of sump overflow were withdrawn from the bottom of the column. The yields again were practically quantitative.

The following mixtures can be separated with equal success in the same manner as in Examples 1–4 with ethylene glycol: 1,3-dioxolane-water, 1,3-dioxolane-ethanol, 1,3 - dioxolane - ethanol - water, methoxyethoxymethane-methanol, acetone ethylene acetal-water.

*Example 5*

258 g. per hour of a mixture of 94.6% of methylal and 5.4% of methanol and 112 g. per hour of diethylene glycol were supplied to a fractionating column as in Example 1 in a volumetric ratio of 3:1. As an average, 241 g. per hour of pure methylal and 128 g. per hour of sump overflow were withdrawn from the head and bottom of the column. The yields were practically 100%.

*Example 6*

344 g. per hour of a mixture of 94.6% of methylal and 5.4% of methanol and 225 g. per hour of triethylene glycol were supplied to a fractionating column as in Example 1 in a volumetric ratio of 2:1. As an average, 319 g. per hour of pure methylal and 278 g. of sump overflow were withdrawn from the head and bottom of the column. The yields were almost quantitative.

*Example 7*

344 g. per hour of a mixture of 94.6% of methylal and 5.4% of methanol and 101 g. per hour of 1,3-butylene glycol were supplied to a fractionating column as in Example 1 in a volumetric ratio of 4:1. As an average, 323 g. per hour of pure methylal and 120 g. per hour of sump overflow were withdrawn from the head and bottom of the column. The yields with practically complete separation were almost 100%.

*Example 8*

258 g. per hour of a mixture of 94.6% of methylal and 5.4% of methanol and 101 g. per hour of methyl diglycol were supplied to a fractionating column as in Example 1 in a volumetric ratio of 3:1, respectively at 33° C. and 25° C. As an average, 237 g. per hour of pure methylal and 120 g. per hour of sump overflow were withdrawn from the head and bottom of the column. The sump overflow was separated into its components by distillation. The yields were almost quantitative.

*Example 9*

430 g. per hour of a mixture of 94.6% of methylal and 5.4% of methanol and 98 g. per hour of ethanol amine were supplied to a fractionating column as in Example 8 in a volumetric ratio of 5:1. As an average, 405 g. per hour of pure methylal and 121 g. per hour of sump overflow were withdrawn from the head and bottom of the column. The yields were almost quantitative.

*Example 10*

422 g. per hour of a mixture of 97% of methylal and 3% of water and 80 g. per hour of triethanol amine were supplied to a fractionating column as in Example 8 in a volumetric ratio of about 6:1. As an average, 416 g. per hour of pure water free methylal and 84 g. per hour of sump overflow were withdrawn from the head and bottom of the column. The yields were almost quantitative.

*Example 11*

344 g. per hour of a mixture of 94.6% of methylal and 5.4% of methanol and 98 g. per hour of triethylene tetramine were supplied to a fractionating column as in Example 8 in a volumetric ratio of 4:1. As an average, 322 g. of pure methylal and 118 g. per hour of sump effluent were withdrawn from the head and bottom of the column. The yield was almost quantitative.

The extraction agents $RXX'_n$ employed in Examples 5–11 can also be used with equal success in the separation of the other mixtures listed at the end of Example 4.

*Example 12*

415 g. per hour of a mixture of 60% of methylal, 20% of methanol and 20% water and 80 g. per hour of ethanol amine were supplied to a fractionating column as in Example 8 in a volumetric ratio of 6:1. As an average, 330 g. per hour of pure methylal and 161 g. per hour of sump effluent were withdrawn from the head and bottom of the column. The yield was almost 100%.

*Example 13*

180 g. per hour of a mixture of 75% of acetaldehyde dimethyl acetal and 25% of methanol and 101 g. per hour of ethanol amine were supplied per hour to a fractionating column as in Example 1 in a volumetric ratio of about 2:1, respectively at 35° C and 57° C. As an average, 133 g. per hour of pure acetaldehyde dimethyl acetal and 145 g. per hour of sump effluent were withdrawn from the head and bottom of the column. The yield was almost quantitative.

Water containing acetaldehyde dimethyl acetal was treated with equal success. Furthermore, the ethanol amine can be replaced with equal success by the extraction agents $RXX'_n$ employed in Examples 4–8, 10 and 11.

We claim:

Process for the recovery of water free and methanol free methylal from methylal containing at least one of the impurities water and methanol which comprises subjecting such impure methylal to fractional distillation in a fractionating column while introducing a liquid compound of the formula $RXX'_n$ into the upper portion of the fractionating column as an extraction agent, X being a radical selected from the group consisting of —OH and —NH$_2$, X' being a radical selected from the group consisting of —OH, —OR', —NH$_2$, —NHR' and —NR'$_2$ radicals in which R' is an alkyl radical, $n$ is an integer and R is a radical selected from the group consisting of aliphatic hydrocarbon radicals containing at least two carbon atoms and such radicals interrupted by heteroatoms with drawing the water free and methanol free methylal from the head of the fractionating column and withdrawing the extraction agent containing the impurities entrained thereby from the sump of the column.

References Cited by the Examiner

UNITED STATES PATENTS 2,559,520  7/1951  Smith et al. _____ 202—39.5
2,575,243  11/1951  Carlson et al. _____ 202—39.5

NORMAN YUDKOFF, *Primary Examiner.*

GEORGE D. MITCHELL, MILTON STERMAN,
*Examiners.*